3,132,984
PROCESS OF MAKING A SURGICAL DRESSING
Thomas Parry Davies, Skipton, England, assignor to
Johnson & Johnson, a corporation of New Jersey
No Drawing. Original application Oct. 7, 1954, Ser. No.
461,020, now Patent No. 3,006,338, dated Oct. 31, 1961.
Divided and this application May 9, 1960, Ser. No.
30,706
6 Claims. (Cl. 156—334)

This invention comprises an improved surgical dressing having non-stick properties, particularly useful as a wound dressing or wound dressing facing.

This application is a division of application Serial No. 461,020 filed October 7, 1954, now U.S. Patent No. 3,006,338.

Fabrics woven from polythene filaments or strands have been used as a wound dressing facing, replacing the normal cotton gauze, and they have had the advantage of making use of the inert properties of polythene and of its property of not adhering to wound surfaces. This is particularly important in the case of dressings used on burns. However, there are certain disadvantages to the use of such polythene fabrics in that the pore size is relatively large so that the serous exudate may seep back to the wound after having passed through the fabric to the absorbent backing. Also the polythene fabric tends to leave pattern marks on the healing wound. A further disadvantage is the relatively high cost.

One object of the present invention is to make use of the advantageous properties of polythene and like film-forming material as a surgical dressing material whilst avoiding the aforesaid drawbacks.

Another object is to provide a surgical dressing having inert properties, especially in the presence of blood and serum.

A surgical dressing according to the present invention comprises a porous, fibrous, preferably cellulosic fabric (e.g. cotton or rayon) treated with polythene or the like inert film-forming material to produce a foraminous structure. As examples of film-forming materials other than polythene there may be mentioned vinyl polymers such as polyvinyl chloride and polyvinyl acetate, or copolymers of vinyl chloride and vinyl acetate, and polyesters and polyamides.

The nature of the film-forming material and the manner of treatment of the fabric therewith should be such that the film-forming material is produced on the fabric in a particulate form as distinct from a continuous film.

The desired advantage of minimum tendency to stick to the wound consistent with permeability are made possible by the presence of the particulate plastic film-forming material in the surgical dressing of the invention.

In order to increase the non-sticking property of the dressing a silicone resin may be applied to the fabric. The latter may be applied in admixture with the film-forming material.

The particulate form of the film-forming material may be described as the presence of such material distributed in heterogeneous fashion in the form of small patches. Some of the material will be on the surface, and other portions will be in the interior of the fabric between individual fibers. Although the polythene or mixture thereof with silicone resin may be applied to the fabric by a "hot melt" process, use of an aqueous emulsion is preferred, since by the latter method the necessary porosity in the finished product is more readily obtained. The treatment is preferably an impregnation of the fabric with the film-forming material such as polythene in aqueous emulsion or dispersion, followed by drying and fusion of the material in situ. The impregnation procedure utilized deposits the polythene on the fabric in the form of minute globules since in the emulsion the polythene is present as a discontinuous phase, and the water is present as a continuous phase. During the drying operation the water is removed and the polythene is dispersed on the surface and in the interior of the fabric in the form of small particles or globules. These generally fuse and coalesce to some extent during the drying and calendering operation and the result is that polythene will appear on the fabric in the desired heterogeneous or particulate fashion, i.e. in the form of small patches of film.

The surface of the dressing material, especially that surface in contact with the wound or lesion, is preferably made substantially free from projecting fibers, as by hot-pressing the fabric after impregnation and drying. The hot-pressing may be effected by running the fabric between smooth heated metal rollers whereby a local temperature of approximately 100° C. is achieved.

Examples of fibrous fabric are absorbent paper, a carded web of fibers, a woven fabric, or a nonwoven fabric. In the case of the nonwoven fabric, the fabric may consist of a carded web of the textile fibers reinforced by a bonding agent applied so as to leave the fabric porous. In this respect it is preferred to use an intermittently bonded web of fibers wherein the bonding medium is applied along lines or over spaced areas disposed so as to reinforce and hold together the fibers of the web. An example of such fabric is that described in British Patent No. 468,529.

After impregnation of the fibrous web or fabric, partial drying may be effected by passing the material over a stack of steam-heated rolls and then through a bath containing hot water to wash off as completely as possible the emulsifying agent used in making the emulsion. This is followed by complete drying over a further stack of steam-heated rolls. The fabric may then be passed through a hot calender whereby a smooth surface free from projecting fibers is obtained.

An alternative procedure for obtaining a smooth fiber-free surface, which is particularly useful when the material is to be sterilized before use, employs a film of regenerated cellulose or other flexible film capable of adhering slightly to the face of the fabric upon the application of heat. In this procedure, the fabric, after impregnation, washing and drying, may be interleaved with a single ply of an inert flexible film such as regenerated cellulose and rolled under tension upon a core. Long lengths of the fabric can be conveniently rolled up in this way. The roll is then heated sufficiently to cause fusion of the polythene or like plastic deposited on the fabric. The heating may be effected in dry hot air or in steam under pressure. On cooling, the treated fabric has a smooth fiber-free surface on both sides, the interleaving film being lightly anchored to one side as a protective coating. This composite fabric may be sterilized by customary means and the interleaving film be peeled off prior to use.

According to a further feature of the invention there is produced a dressing having a facing of fabric, treated with polythene or the like as aforesaid, and having a backing of absorbent fibrous material. This may be effected by plying or laminating the washed and dried impregnated fabric with a sheet of nonwoven or woven fabric, or a carded web of absorbent fibers or a sheet of absorbent paper, and then passing the composite material through smooth heated metal rolls, before batching into rolls. The fibrous material may suitably be cellulosic, e.g. cotton or rayon. The resultant composite fabric has one surface smooth and fiber-free and the other absorbent and fibrous. Alternatively the washed and dried impregnated fabric is plied together with a sheet of absorbent fibrous material on the one side, and with a sheet of regenerated cellulose or other flexible film on the other side. The three-ply composite material may be wound upon a core under tension to give a roll which is then heated sufficiently to produce the necessary fusion, as hereinbefore indicated. After cooling, the material has one side absorbent and fibrous and the other side has a smooth fiber-free surface of polythene or the like temporarily protected by the interleaving film.

The amount of polythene or the like applied to the fabric in order to produce the required properties in the non-stick dressing may vary within quite wide limits. In the case of polythene itself, less than 50% on the fabric, based on the weight of the initial fabric, will generally be insufficient to ensure a fiber-free surface. On the other hand above 600% of polythene, on the same weight basis, the fabric will generally be insufficiently permeable to serous exudate. The preferred amount of polythene is about 100–150% by weight based on the weight of the initial fabric.

*Example I*

An intermittently bonded nonwoven fabric, e.g. according to British Patent 468,529, weighing 210 grains per square yard, is impregnated with a polythene emulsion (30% solids by weight), so that 300 grains of solid polythene per square yard are retained by the fabric in particulate form. The fabric is partially dried over a stack of steam-heated rolls, washed in hot water, and then dried completely over a further stack of steam-heated rolls. The washed and dried material is interleaved with regenerated cellulose film and rolled under tension so that 50 yards of material are in the roll. The roll is heated at 120° C. in dry air for 30 minutes and allowed to cool. The resultant fabric has a smooth fiber-free surface on both sides, one side being temporarily protected by the regenerated cellulose film. This fabric is particularly effective as a non-stick wound dressing.

*Example II*

The washed and dried polythene-impregnated nonwoven fabric produced according to Example I is plied together with a sheet of the same initial nonwoven fabric on the one side and with a sheet of regenerated cellulose film on the other side. The three-ply composite sheet is rolled upon a core under tension and heated in steam at 25 lbs. per square inch pressure for 30 minutes. The resultant fabric has a smooth fiber-free surface temporarily protected by the regenerated cellulose film and an absorbent fibrous backing. This fabric is also effective as a non-stick dressing.

*Example III*

A nonwoven cellulosic fabric of the kind mentioned in Example I is impregnated with an aqueous dispersion of a mixture of polythene and a silicone resin (Drisil 148) so that 150 grains of polythene and 5 grains of silicone resin are applied per square yard of fabric. The fabric is partially dried over a stack of steam-heated rolls, washed in hot water, and then dried over a further stack of steam-heated rolls. The washed and dried material is interleaved with regenerated cellulose film and rolled under tension so that 100 yards of material are in the roll. The roll is heated at 120° C. in dry air for 30 minutes and allowed to cool. The resultant fabric has a smooth fiber-free surface on both sides, one side being temporarily protected by the regenerated cellulose film.

The fabric produced according to these examples is dimensionally stable on sterilization in an autoclave, due to the support given by the regenerated cellulose film.

As an example of using the dressing, a six inch square of the fabric is applied to the wound after removing the cellulose film. Two plies of semi-absorbent tissue paper (basis weight 12 lbs.) are placed over the square of fabric, followed by about 250 grains of absorbent cotton wool. The complete dressing is held in place by a bandage, preferably of the self-conforming type.

I claim:
1. The method of making surgical dressings having low adhesion to healing wound surfaces comprising dispersing throughout a first fibrous fabric and on the surface thereof small globules of film-forming plastic material by impregnating said first fibrous fabric with an aqueous emulsion of said film-forming plastic material and thereafter drying said fabric, placing one surface of said impregnated first fibrous fabric in face-to-face contact with the surface of a second fibrous fabric substantially free of said film-forming plastic material and uniting said first and second fabrics by subjecting said fabrics to heat and pressure and forming on the other surface of said first fibrous fabric smooth film-like patches of said film-forming plastic material by pressing said other surface against a smooth surface while heating the same to above the softening temperature of said film-forming plastic material.

2. The process of claim 1 wherein the film-like patches are formed on the surface at the time said two fabrics are bonded together.

3. The process of claim 1 in which said film-forming plastic material is polyethylene.

4. The method of making a surgical dressing having non-stick properties which comprises impregnating a fibrous nonwoven cellulosic fabric with an aqueous emulsion of polyethylene, drying said impregnated fabric, permanently laminating said fabric on one side with a sheet of absorbent cellulosic nonwoven fibrous material substantially free of said plastic material and releasably laminating said fabric on the other side with an inert flexible continuous film by heating said laminate of fabric and film to above the softening temperature of said polyethylene while under pressure to permanently bind together said fabrics and lightly and releasably bond said continuous film to the surface of said impregnated fabric, the surface of said impregnated fabric under said continuous film being substantially free of fibers projecting therefrom while still retaining the permeability of said surface to body fluids.

5. The method of making a surgical dressing having at least one surface permeable to wound exudate and possessing the quality of low adhesion to healing wound surfaces comprising dispersing throughout a fibrous fabric and on the surface thereof silicone resin and small globules of polyethylene by impregnating said fibrous fabric with an aqueous emulsion of polyethylene, said aqueous emulsion also having dispersed therein a silicone resin, drying said impregnated fabric and thereafter smoothing the globules on the surface of said fabric into small film-like patches by pressing the surface of said fabric against a smooth releasable surface while heating said smooth releasable surface while heating said smooth releasable surface to above the softening temperature of said polyethylene.

6. The method of making a surgical dressing having at least one surface permeable to wound exudate and possessing the quality of low adhesion to healing wound surfaces comprising dispersing throughout a cellulosic fibrous non-woven fabric and on the surface thereof small globules of film-forming plastic material by impregnating said cellulosic fibrous non-woven fabric with an aqueous emulsion of said inert film-forming plastic material, drying said impregnated fabric, placing over at least one surface of said dried impregnated fabric an inert flexible continuous film, rolling said film and fabric up together to press said film against said fabric, and heating said fabric and film while said film is against said fabric surface to above the softening temperature of said film-forming plastic material to cause smoothing of the surface globules of film-forming plastic material and obtain light readily releasable adhesion to the flexible continuous film.

References Cited in the file of this patent

UNITED STATES PATENTS

| | | |
|---|---|---|
| 2,703,083 | Gross | Mar. 1, 1955 |
| 2,777,779 | Harwood et al. | Jan. 15, 1957 |
| 2,880,113 | Drelich | Mar. 31, 1959 |
| 2,992,149 | Drelich | July 11, 1961 |
| 2,999,788 | Morgan | Sept. 12, 1961 |

FOREIGN PATENTS

| | | |
|---|---|---|
| 641,568 | Great Britain | Aug. 16, 1950 |